United States Patent [19]

Harry

[11] Patent Number: 5,256,715

[45] Date of Patent: Oct. 26, 1993

[54] POLY(ARYLENE SULFIDE) RESIN COMPOSITION

[75] Inventor: Nathaniel Harry, South Field, Mich.

[73] Assignee: Phillips Petroleum Company, Bartlesville, Okla.

[21] Appl. No.: 762,835

[22] Filed: Sep. 19, 1991

[51] Int. Cl.⁵ .............................................. C08K 5/54
[52] U.S. Cl. .................................... 524/188; 524/261; 524/262; 524/424
[58] Field of Search ............... 524/188, 261, 262, 424

[56] References Cited

U.S. PATENT DOCUMENTS 4,038,456  7/1977  Marsden et al. ..................... 428/391
5,086,102  2/1992  Pielartzik et al. ................... 524/188

Primary Examiner—Paul R. Michl
Assistant Examiner—John J. Guarriello
Attorney, Agent, or Firm—Beverly M. Dollar

[57] ABSTRACT

Fiber reinforced poly(arylene sulfide) compositions are provided which contain at least one azidosilane. The incorporation of the azidosilane results in a composition exhibiting improved tensile strength, flexural strength, and impact strength.

18 Claims, No Drawings

POLY(ARYLENE SULFIDE) RESIN COMPOSITION

This invention relates to a composition comprising poly(arylene sulfide). Another aspect of this invention relates to compositions comprising poly(arylene sulfide) and additives which are useful in increasing the mechanical strength of the composition. In still another aspect, this invention relates to a process in which the poly(arylene sulfide) is blended with additives to increase the mechanical strength of the composition.

BACKGROUND OF THE INVENTION

Compounds containing poly(arylene sulfide) polymers are known for their desirable properties of moldability, thermal stability, and chemical resistance. Such compounds have been found useful in applications requiring increased impact strength with the addition of various fillers. Because problems have been encountered in compounding and processing when using polymers blended with high proportions of filler, several additives have been proposed to improve processability. The development of other additives to increase the processibility of poly(arylene sulfide) polymers while not adversely affecting strength would be desirable.

SUMMARY OF THE INVENTION

An object of this invention is to provide poly(arylene sulfide) compositions having increased tensile strength, impact strength, and flexural strength. Another object of this invention is to provide additives to be blended in the poly(arylene sulfide) compositions to increase the mechanical strength of said composition. Still another object of this invention is to provide a process in which the additives are blended in the poly(arylene sulfide) composition.

Other objects, advantages and features of the invention will be readily apparent to one skilled in the art from the detailed description of the invention and the appended claims.

In accordance with the invention, it has been found that the addition of at least one azidosilane, in combination with a fibrous reinforcement, to poly(arylene sulfide) polymers results in a composition with increased tensile strength, impact strength, and flexual strength. Thus, in accordance with a first embodiment of this invention, compositions are provided which comprise (a) a poly(arylene sulfide) polymer, (b) at least one azidosilane, and (c) at least one fibrous reinforcement.

In yet another embodiment of this invention, the mechanical strength of a poly(arylene sulfide) composition is improved by a process in which the poly(arylene sulfide) polymer is blended with at least one azidosilane and a fibrous reinforcement.

DETAILED DESCRIPTION OF THE INVENTION

The poly(arylene sulfide) polymer useful in this invention can be prepared by any method known to those of ordinary skill in the art.

Methods of preparing poly(arylene sulfide) polymers are disclosed in U.S. Pat. No. 3,354,129 of Edmonds and Hill, which discloses suitable processes for preparing relatively low molecular weight poly(arylene sulfide) polymers, and U.S. Pat. No. 3,919,177 of Campbell, which discloses a method for preparing essentially linear, relatively high molecular weight poly(arylene sulfide) polymers.

In general, our invention employs poly(arylene sulfide) polymers which are prepared by contacting under suitable conditions a sulfur source, at least one dihalogenated aromatic compound, a polar organic compound, and optionally, other reactants such as polyhalogenated aromatic compounds, bases, and alkali metal carboxylates.

The dihalogenated aromatic compounds suitable for use in preparing poly(arylene sulfide) can be represented by the formula

wherein each X is a halogen, and each R is independently selected from hydrogen, alkyl, cycloalkyl, aryl, alkylaryl, and arylalkyl radicals having from about 6 to 24 carbon atoms. Examples of suitable dihalogenated aromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dicblorobenzene, 1-octyl-5-(3-methylcyclopentyl)-2,5-dicblorobenzene, and the like, and mixtures thereof. The preferred dihalogenated aromatic compound for use in this invention is p-dichlorobenzene (DCB).

The polar organic compounds suitable for use in the preparation of the poly(arylene sulfide) polymer include cyclic or acyclic organic amines having from 1 to 10 carbon atoms per molecule. Suitable examples include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, c-caprolactam, N-methyl-ε-caprolactam, N,N'-ethylenedi-2-pyrrolidone, hexamethylphosphoramide, tetramethylurea, 1,3 dimethylimidazolidinone and the like, and mixtures thereof. The preferred polar organic compound for use is N-methyl-2-pyrrolidone (NMP).

Any suitable source of sulfur can be used in the polymerization process. Suitable sources of sulfur include thiosulfates, substituted and unsubstituted thioureas, cyclic and acylic thioamides, thiocarbamates, thiocarbonates, trithiocarbonates, organic sulfur-containing compounds selected from mercaptans, mercaptides and sulfides, hydrogen sulfide, phosphorus pentasulfide, carbon disulfides and carbon oxysulfides, and alkali metal sulfides and bisulfides, and the like, or mixtures thereof. It is generally preferred to use as a source of sulfur in this invention an alkali metal bisulfide wherein the alkali metal is selected from sodium, potassium, lithium, rubidium, and cesium. The preferred alkali metal bisulfide is sodium bisulfide (NaSH). The alkali metal bisulfide usually is employed in hydrated form and/or as an aqueous mixture, preferably in the liquid state at the temperature of use. Although the water present with the alkali metal bisulfide can vary over a considerable range, generally the alkali metal bisulfide will be present in the solution or hydrate in an amount within the range of about 20 to about 70 weight percent, preferably about 25 to about 60 weight percent, based on the total weight of alkali metal bisulfide plus water associated therewith.

The polyhalogenated aromatic compounds which can be optionally employed as a reactant in the preparation of poly(arylene sulfide) are preferably represented by the formula: $R'''X_n$, where each X is selected from the group consisting of chlorine, bromine, and iodine, n is an integer of 3 to 6, and $R'''$ is a polyvalent aromatic radical of valence n which can have up to about 4 methyl substituents, the total number of carbon atoms in $R'''$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2-dibromo-4-iodobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3, 3',5,5'-tetramethylbiphenyl, 1,2,3,4-tetrachloronaphthalene, 1,2,4-tribromo-6-methylnaphthalene, and the like and mixtures thereof.

Suitable bases for use in preparation of poly(arylene sulfide) polymer are alkali metal hydroxides including lithium hydroxide, sodium hydroxide, potassium hydroxide, rubidium hydroxide, cesium hydroxide, and mixtures thereof. If desired, the hydroxide can be produced in situ by the reaction of the corresponding oxide with water. The preferred base for use is sodium hydroxide (NaOH). Although the alkali metal hydroxide can be employed in anhydrous form, preferably it is employed in hydrated form and/or as an aqueous mixture, more preferably in the liquid state at the temperature of use. Although the water present with the alkali metal hydroxide can vary over a considerable range, generally the alkali metal hydroxide will be present in the solution or hydrate in an amount up to about 70 weight percent, preferably about 25 to about 60 weight percent, based on the total weight of alkali metal hydroxide plus water associated therewith.

Suitable alkali metal carboxylates which can be employed in the preparation can be represented by the formula $R''CO_2M$, where $R''$ is a hydrocarbyl radical selected from alkyl, cycloalkyl, and aryl and combinations thereof such as alkylaryl, alkyl-cycloalkyl, cycloalkylalkyl, arylalkyl, arylcycloalkyl, alkylarylalkyl and alkylcycloalkylalkyl, wherein the hydrocarbyl radical having 1 to about 20 carbon atoms, and M is an alkali metal selected from the group consisting of lithium, sodium, potassium, rubidium and cesium. Preferably $R''$ is an alkyl radical having 1 to about 6 carbon atoms or a phenyl radical and M is lithium or sodium. If desired, the alkali metal carboxylate can be employed as a hydrate or as a solution or dispersion in water. If desired, the alkali metal carboxylate can be produced in situ by the reaction of the corresponding carboxylic acid and an alkali metal hydroxide or carbonate.

Examples of some alkali metal carboxylates which can be employed in the polymerization include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyoctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolyacetate, lithium 4-ethylcyclohexylacetate, and the like, and mixtures thereof. The preferred alkali metal carboxylate for use in this invention is sodium acetate (NaOAc).

Although the ratio of reactants can vary considerably, the ratio of gram-moles of dihalogenated aromatic compound to gram-atoms of divalent sulfur in the sulfur source should be within the range of from 0.8/1 to about 2/1. The gram-moles of alkali metal carboxylate, if used, per gram-mole of dihalogenated aromatic compound should be within the range of from 0.05/1 to about 4/1. The amount of polar organic compound employed in the polymerization reaction mixture can vary considerably. Generally, the molar ratio of polar organic compound to sulfur source will be within the range of about 1/1 to about 10/1. The molar ratio of the base, if used, to the sulfur source will be within the range of about 0.3/1. to about 4/1.

The charge sequence of the various compounds employed in the polymerization process can be varied as desired. One convenient method is to simply charge all the compounds in any desired sequence to a suitable reaction vessel equipped with agitation means at about room temperature and then to heat the mixture with stirring to the desired polymerization reaction temperature.

The temperature at which the polymerization can be conducted can vary over a wide range and will generally be within the range of from 215° C. to 375° C. and preferably from 225° C. to 285° C. The reaction time will be within the range of from 10 minutes to about 3 days and preferably 1 hour to 8 hours. The pressure need be only sufficient to maintain the dihalogenated aromatic compound and the organic compound substantially in the liquid phase, and to retain the sulfur source therein.

At the termination of the polymerization reaction, the reaction mixture comprising poly(arylene sulfide) polymer, poler organic compound, and water will generally be in a substantially liquid form at the reaction temperatures. The poly(arylene sulfide) polymer can be recovered by any method known to those of ordinary skill in the art. For example, the poly(arylene sulfide) polymer can be recovered by slowly cooling the mixture and optionally adding, if desired, a separation agent to the mixture for particle size control. The cooled mixture, a slurry comprising solid poly(arylene sulfide) particles, polar organic compound, non-polymeric and low molecular weight materials, can be contacted, if desired, with an effective amount of at least one extraction agent under conditions suitable for removal of at least a portion of the low molecular weight organic materials from the solid poly(arylene sulfide) polymer.

The use of separation agents for causing separation of molten poly(arylene sulfide) from the polar organic compound is described in U.S. Pat. No. 4,415,729, which is hereby incorporated by reference. The preferred separation agent is water and the quantities employed are typically about 0.05 to about 2 moles of separation agent/mole of polar organic compound when NMP is employed as the polar organic compound. When the separation agent is water and the extraction agent is also NMP, the ratio of extraction agent to separation agent is typically in the range of about 1/1 to 10/1. The addition of the separation agent and slow cooling can be performed in any order or simultaneously, or a portion of the separation agent can be added, followed by a period of slow cooling, followed by the addition of extraction agent, and so on. By "slow cooling", it is meant that no external cooling means is applied to the reactor. Generally the rate of cooling will not exceed about 1° C. (1.8° F.) per minute.

The poly(arylene sulfide) used in the inventive composition can be an essentially linear, high molecular weight polymer prior to curing. Essentially linear poly(arylene sulfide), as used herein, is defined as a polymer having no branching or such a small amount of branching as to have substantially no effect on the polymer properties. For example, the amount of polyhaloaromatic impurity found in the dihaloaromatic used in the poly(arylene sulfide) polymerization process would not be sufficient to cause the resultant poly(arylene sulfide) to be outside the essentially linear definition.

The preferred essentially linear, high molecular weight poly(arylene sulfide) is poly(phenylene sulfide). The melt flow of the essentially linear, high molecular weight poly(phenylene sulfide) is generally less than about 1000 prior to curing and about 50 to about 400, preferably about 150 to about 300, after curing. The melt flow of the poly(phenylene sulfide) polymer is determined using ASTM D 1238-86 condition 316/5 modified to use a 5 minute preheat time.

It is also within the scope of this invention to use a cured poly(arylene sulfide) which was an essentially linear, low molecular weight poly(arylene sulfide) prior to curing. The, preferred essentially linear, low molecular weight poly(arylene sulfide) is poly(phenylene sulfide). The melt flow of the essentially linear, low molecular weight poly(phenylene sulfide) is about 3,000 to about 8,000 prior to curing and about 25 to about 200, preferably about 50 to about 150, after curing.

Curing is defined herein as a distinct process step after polymer drying comprising a thermal treatment of the polymer in the presence of an oxygen-containing atmosphere. The preferred oxygen-containing atmosphere is air. In one curing process, the treatment can be above the melting point for semi-crystalline polymers, or alternately, the treatment can be above the softening point for amorphous polymers. A second curing process is a solid state process in which the polymer is heated to a temperature up to but below the melting point of a semi-crystalline polymer or, alternately, up to but below the softening point of an amorphous polymer. The solid state curing process is currently preferred for curing large quantities of polymer, such as in a commercial process. For example, the solid state curing of poly(phenylene sulfide), which has a melting point of about 540° F., is generally carried out at a temperature of about 350° F. to about 500° F.

The poly(arylene sulfide) polymer used in this invention can optionally be acid washed during the poly(arylene sulfide) recovery process according to a process similar to that disclosed in U.S. Pat. No. 4,801,664. Any suitable organic or inorganic acid which is water soluble can be used in the acid washing process. Examples of suitable organic acids include, but are not limited to, acetic acid, formic acid, oxalic acid, fumaric acid, and monopotassium phthalic acid. The presently preferred organic acid is acetic acid. Examples of suitable inorganic acids include, but are not limited to, hydrochloric acid, monoammonium phosphate, sulfuric acid, phosphoric acid, boric acid, nitric acid, sodium dihydrogenphosphate, ammonium dihydrogenphosphate, and carbonic acid. The presently preferred inorganic acid is hydrochloric acid.

The invention is directd to improving the mechanical strength of polyarylene sulfide) polymers by the introduction of at least one azidosilane together with fillers, e.g., ground glass, glass fibers, other siliceous materials and the like and mixtures thereof. The amount of such fillers can constitute from about 0.5 weight percent up to about 70 weight percent of the total composition. In addition to the above mentioned fillers, conventional additives such as pigments, lubricants, antistatic agents, corrosion inhibitors, plasticizers, et., can be incorporated into the poly(arylene sulfide) compositions, with the amounts of such ingredients used depending on the particular application involved.

The azidosilanes useful in this invention are those materials represented by the formula

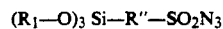

in which each $R_1$ is individually selected from the group consisting of alkyl, aryl, or cycloalkyl groups having from 1 to 14 carbon atoms; and wherein $R''$ is an alkylene group having from 1 to 22 carbon atoms.

Such azidosilanes can be prepared by any method known to those of skill in the art, or can be purchased commercially. For example, a suitable azidosilane is commercially available from Hercules, Inc. under the trade name Az-Cup.

In one embodiment of this invention, the poly(arylene sulfide) composition with improved tensile strength, flexural strength, and impact strength comprises at least one poly(arylene sulfide), at least one azidosilane, and at least one fibrous reinforcement. It is within the scope of this invention to add other additives to this composition such as corrosion inhibitors, stabilizers, nucleating agents, pigments and/or plasticizers. Broadly, the poly(arylene sulfide) composition comprises about 0.005 to about 10 weight percent, preferably about 0.1 to about 2.0, most preferably 0.5 to 1.5 weight percent of the azidosilane, and about 5 to about 70, preferably about 25 to about 45 weight percent of the fibrous reinforcement, based on the total weight of the composition.

The fibrous reinforcement useful in this invention can be any fibrous reinforcement compatible with the poly(arylene sulfide) polymer which can impart strength to the composition. It is presently preferred to use glass fiber as the fibrous reinforcement in this invention due to its availability and the good results obtained with its use.

The glass fiber employed in this invention can be chosen from any of those products commercially available which are typically used as fillers and reinforcing agents in polymeric compositions. Generally, glass fibers of about 1/32 to about 2 inches in length are used as feedstocks in the invention composition.

The glass fiber is generally pres(int in an amount of about 5 to about 70, preferably about 25 to about 45 weight percent and most preferably about 35 to about 45 weight percent based on the total composition.

Lithium carbonate and/or hydrotalcites can be employed in this invention as mold corrosion inhibitors. The hydrotalcites optionally employed in this invention can be a natural or synthetic material which corresponds roughly to naturally-occurring minerals having chemical structures such as $Mg_6Al_2(OH)_{16}CO_3.4H_2O$ or $Al_2O_3.6MgO.CO_2.12H_2O$. Although the magnesium/aluminum hydrates are the most common cationic species for the hydrotalcites, various metals can be substituted. For example, magnesium can be replaced by calcium, zinc, copper, manganese, lithium or nickel; and aluminum can be replaced by chromium (plus 3) or iron. The anionic species can also vary, with carbonate or phosphate the most likely candidates. The most readily available hydrotalcite compounds will be magnesium-aluminum hydroxy carbonate hydrates. the preferred hydrotalcite compound is magnesium aluminum hydroxy carbonate hydrate, which is available under the commercial name DHT-4A sold by Kyowa Chemical Industry Company, Ltd., Osaha, Japan, which is characterized by the manufacturer as $Mg_{4.5}Al_2(OH)_{13}Co_{3}3.5 H_2O$.

The amount of lithium carbonate or hydrotalcite optionally employed in the present invention generally will be in the range of 0.05 to 3.0 weight percent, more preferably 0.10 to 2.0 weight percent of the total composition.

The nucleating agents which can optionally be employed in this invention are any additives which are effective to achieve the desired crystalline morphology modification of the poly(arylene sulfide). Usually the agent will comprise a polymer-containing additive since polymers are expected to be readily compatible with the other components. Usually, it will also be crystallizable and have a high crystalline melt point. The preferred nucleating agents are polymers selected from the group consisting of poly(arylene sulfide-ketone)s and polyaryl ketones. It is preferred that the poly(arylene sulfide-ketone) or polyaryl ketone have a melting point of at least about 20° C. above the melting point of the poly(arylene sulfide) and more preferably at least about 40° to about 100° C. above the poly(arylene sulfide) melting point.

The most preferred nucleating agent is a polyether ether ketone) such as, for example, poly(1,4-oxyphenyloxy-p,p′-benzophenone). This polymer is commercially available from ICI.

The amount of nucleating agent present in the invention composition if employed generally will be in the range of 0.01 to 3.0 weight percent, more preferably 0.05 to 2.0 weight percent of the total composition.

The compositions of the invention can optionally contain an organosilane compound selected from the group of epoxy functional silanes. The preferred epoxy functional silane is gamma-glycidoxypropyltrimethoxysilane.

Such organosilanes, if employed, generally will be present in the compositions of the invention in an amount of from about 0.01 to about 2 weight percent, preferably from about 0.4 to about 1.2 weight percent, and most preferably from about 0.6 to about 1.0 weight percent based on the weight of the total composition.

A mold release agent can be incorporated in the invention composition. Any suitable mold release agent can be employed, however, it is preferred to use polyethylene. If a polyethylene is used, a high density polyethylene is preferred. By high density, it is meant that the polyethylene has a density greater than about 0.941.

The amount of mold release agent present in the invention composition generally will be in the range of 0.01 to 3.0 weight percent, preferably 0.05 to 2.0 weight percent of the total composition.

The pigments which can optionally be employed in the invention composition are those known to those of ordinary skill in the art, which can tolerate the relatively high processing temperatures required, e.g. 600° F. for poly(arylene sulfide). Typical examples include titanium dioxide, iron oxide, cadmium sulfide, phthalocyanine blue, carbon black and the like and mixtures thereof.

The amount of pigment used, if present, is typically in the range of 0.01 to 10.0 weight percent, preferably 0.05 to 2.0 weight percent of the total composition.

The addition of the additives listed herein and other additives which do not adversely affect the properties of the invention composition is meant to be within the scope of this invention.

It has been found, however, that the addition of the composition of mineral fillers such as mica, talc, and the like obviate the beneficial increase in strength obtained by use of the azidosilane additive, thus the use of such mineral fillers should be avoided when practicing this invention.

The compositions of this invention can be made in accordance with any method wherein the poly(arylene sulfide), azidosilane, fiberous reinforcement, and other components, (if used), are combined to form a mixture. Many suitable methods are well known to those of skill in the art. By way of example, the components of the composition can be mixed together at room temperature in a rotating drum blender or in an intensive mixer, such as a Henschel mixer, and then extrusion compounded and pelletized at a temperature above about the melting point of the poly(arylene sulfide) to produce a uniform blend.

Once made, the compositions of the invention can be used to form molded articles in accordance with any method suitable for molding thermoplastic compositions. Such methods are well known in the art. The compositions can, for example, be introduced into an injection molding apparatus to produce a melt which is extruded into an injection mold wherein the molded article is formed.

The following examples are provided in order to further illustrate the invention and are not meant to limit the scope thereof.

EXAMPLE I

A poly(arylene sulfide) polymer, poly(phenylene sulfide) polymer from Phillips Petroleum Company sold under the tradename Ryton ® PR-17, was blended with fibrous reinforcement and various additives to prepare three compounds. Two of the compounds contained amounts of an azidosilane according to this invention and a third compound was prepared without any azidosilane.

A series of tests were carried out to determine certain mechanical properties of the compounds. The formulations of the compounds are shown below in Table I.

TABLE I

| | Sample Compositions[a] | | |
|---|---|---|---|
| Components | Inventive Composition 1 (wt. %) | Inventive Composition 2 (wt. %) | Control Composition 3 (wt. %) |
| PPS[b] | 57.75 | 58.25 | 58.75 |
| Glass[c] | 40.00 | 40.00 | 40.00 |
| Li$_2$CO$_3$[d] | 1.00 | 1.00 | 1.00 |
| Azidosilane[e] | 1.00 | 0.50 | 0.00 |

TABLE I-continued

| Components | Sample Compositions[a] | | |
|---|---|---|---|
| | Inventive Composition 1 (wt. %) | Inventive Composition 2 (wt. %) | Control Composition 3 (wt. %) |
| PE[f] | 0.25 | 0.25 | 0.25 |

[a]Percent by weight of the component based on total weight of composition.
[b]Poly(phenylene sulfide) sold by Phillips 66 Company under the tradename of RYTON ® PR-17 having a nominal melt flow rate of 120 g/10 min., measured using ASTM D 1238-86 Condition 315/5.0 modified to use a 5 minute preheat.
[c]Fiberglass (⅛") 497DB from Owens Corning.
[d]Lithium carbonate from Lithcoa Lithium Corp. of America.
[e]Az Cup from Hercules, Inc.
[f]Marlex ® high density polyethylene Grade TR-161 from Phillips 66 Company, having a nominal melt index of 30 when measured according to ASTM 1238-86 Condition 190/2.16.

Each sample was prepared by blending the components in a Henschel mixer for three minutes and passing the resulting mixture through a single screw Crown extruder at 590°-630° F. and pelletizing the same. The pelletized samples were then formed into impact bars (5"×½"×⅛) by conventional injection molding techniques using an Arburg model 220 E/150 injection molding machine operating at 625±10° F. barrel temperature, 5 in/sec. injection speed and 10,000±2,000 Psi injection and holding pressure.

The unannealed and annealed tensile strengths of each sample were determined according to ASTM D638. The flexural modulus and flexural strengths of each sample were determined by the method of ASTM D790. The unmatched izod and notched izod impact strengths of each sample were determined using the procedure of ASTM D256. The results are shown in Table II below.

TABLE II

| | Mechanical Properties | | |
|---|---|---|---|
| | Inventive Composition 1 | Inventive Composition 2 | Control Composition 3 |
| Tensile strength (Psi) | | | |
| Unannealed | 20,550 | 19,900 | 18,600 |
| Annealed | 19,250 | 17,300 | 17,650 |
| Flexural modulus strength (Psi) | 1,793,150 | 1,842,500 | 177,720 |
| Flexural strength (Psi) | 26,975 | 26,700 | 25,775 |
| Impact strength (Ft-lbs/in) | | | |
| Unnotched izod | 5.4 | 5.2 | 4.0 |
| Notched izod | 1.5 | 1.5 | 1.3 |

The results show that the addition of an azidosilane to a PPS composition containing glass improves the tensile strengths and other mechanical properties thereof. For instance, the annealed tensile strength of the composition comprising 1.0% by weight of azidosilane is 9.1% higher than that of the control composition. Similarly, the flexural modulus strength of the inventive composition comprising 0.5% by weight of azidosilane is more than 10 times that of control composition.

EXAMPLE II

Another group of compounds were prepared as described in Example I from a blend of two poly(arylene sulfide) polymers, glass fibers, a mineral filler and various additives. Two of the compounds contained amounts of an azidosilane according to this invention, while the third compound contained no azidosilane. The formulations of the compounds are set out in Table III.

TABLE III

| Components | Comparative Composition 4 (wt. percent)[a] | Comparative Composition 5 (wt. percent) | Control Composition 6 (wt. percent) |
|---|---|---|---|
| PPS A[b] | 36 | 35.5 | 36 |
| PPS B[c] | 5 | 5 | 5 |
| Glass[d] | 35 | 35 | 35 |
| Mineral Filler[e] | 22.25 | 22.25 | 22.25 |
| Oganosilane[f] | — | — | 0.5 |
| PE[g] | 0.25 | 0.25 | 0.25 |
| Li$_2$CO$_3$[h] | 1.0 | 1.0 | 1.0 |
| Azidosilane[i] | 0.5 | 1.0 | — |

[a]Percent by weight of the component based on total weight of composition.
[b]Poly(phenylene sulfide) sold by Phillips 66 Company under the tradename Ryton ® PR-07 having a nominal melt flow rate of 900 g/10 min. measured as in Example I.
[c]Poly(phenylene sulfide) sold by Phillips 66 Company under the tradename Ryton ® PR-11 having a nominal melt flow rate greater than 2500 g/10 min. measured as in Example I.
[d]Fiberglass from Owen Corning Grade 497DB (⅛").
[e]United States Gypsum Co. Grade CA-5 having average particle size of 1.4 microns.
[f]Union Carbide Y9194 organo functional polysulfide silane.
[g]Marlex ® high density polyethylene Grade TR-161 from Phillips 66 Company having a nominal melt index of 30 when measured according to ASTM 1238-86 Condition 190/2.16.
[h]Lithium Carbonate from Lithcoa Lithium Corp. of America.
[i]A Cup from Hercules, Inc.

The compounds listed above were tested like those in Example I. The results of the mechanical testing are set out in Table IV below.

TABLE IV

| | Mechanical Properties | | |
|---|---|---|---|
| | Comparative Composition 4 | Comparative Composition 5 | Control Composition 6 |
| Tensile Strength (Psi) | | | |
| Unannealed | 14,450 | 15,150 | 15,450 |
| Annealed | 14,250 | 14,500 | 14,500 |
| Flexural Modulus (Psi) | 2,064,600 | 2,124,800 | 2,090,900 |
| Flexural Strength (Psi) | 22,050 | 23,700 | 23,175 |
| Impact Strength (ft. lbs/in) | | | |
| Unnotched izod | 3.0 | 3.2 | 3.0 |
| Notched izod | 1.1 | 1.2 | 1.1 |

The results demonstrate that the addition of the azidosilane to the PPS composition containing both glass fibers and a mineral filler does not improve the mechanical strength to any significant degree over a PPS composition without the azidosilane.

EXAMPLE III

A series of compounds were prepared by mixing poly(arylene sulfide) polymers with various amounts of glass, other additives and with and without the azidosilane. Each compound contained 0.25 wt. % of the Marlex ® high density polyethylene Grade TR-161 used in Examples I and II, 1 wt. % Li$_2$CO$_3$ used in Examples I and II, from 20 to 40 wt. % of the glass used in Examples I and II, 1 wt. % of Az Cup azidosilane from Hercules, Inc.; and the balance of the composition was poly(phenylene sulfide) sold by Phillips 66 Company under the tradename Ryton ® PR-06 having a nominal melt flow of 120 g/10 min. when measured as in Example I. Control compositions were also prepared having the same amounts of glass and other additives but containing no azidosilane. The compositions were prepared and tested as described in Example I. The results are set out in Table V below.

TABLE VI

| | 40%[1] Glass | | 35% Glass | | 30% Glass | | 25% Glass | | 20% Glass | |
|---|---|---|---|---|---|---|---|---|---|---|
| | With azido-silane[2] | Without azido-silane | with azido-silane | without azido-silane | with azido-silane | without azido-silane | with azido-silane | without azido-silane | with azido-silane | without azido-silane |
| Tensile Strength (Psi) | | | | | | | | | | |
| Unannealed | 20,050 | 17,850 | 18,200 | 17,150 | 16,500 | 15,600 | 16,250 | 14,700 | 13,150 | 12,500 |
| Annealed | 18,600 | 18,400 | 16,500 | 15,950 | 15,400 | 14,450 | 18,100 | 11,950 | 14,300 | 11,600 |
| Flexural Modulus (Psi) | 1,888,750 | 1,793,150 | 1,633,600 | 1,625,300 | 1,432,550 | 1,385,450 | 1,418,700 | 1,247,900 | 1,150,600 | 1,091,250 |
| Flexural Strength (Psi) | 26,400 | 25,050 | 24,500 | 22,400 | 21,100 | 19,950 | 20,300 | 17,100 | 15,200 | 15,000 |
| Impact Strength (ft-lbs/in) | | | | | | | | | | |
| Unnotched izod | 6.0 | 4.7 | 5.7 | 4.0 | 4.8 | 4.8 | 4.3 | 3.0 | 2.8 | 1.9 |
| Notched izod | 1.5 | 1.3 | 1.4 | 1.2 | 1.3 | 1.2 | 1.2 | 1.1 | 0.99 | 0.88 |

[1] weight percent based on total weight of the composition.
[2] 1 wt. % A Cup from Hercules, Inc.

The results set out above demonstrate that the addition of an azidosilane to a poly(arylene sulfide) composition containing glass results in improved tensile, flexural and impact strength.

While this invention has been described in detail for the purposes of illustration, the invention is not meant to be limited thereby, but is intended to cover all reasonable modifications thereof.

That which is claimed is:

1. A composition consisting essentially of a poly(arylene sulfide) polymer, a fibrous reinforcement, and an amount of at least one azidosilane in the range of about 0.005–10 wt. % based on the total weight of said composition.

2. A composition in accordance with claim 1, wherein the amount of fibrous reinforcement incorporated in said composition is in the range of about 5–70 wt. % based on the total weight of said composition.

3. A composition in accordance with claim 1, wherein said azidosilane is of the formula $$(R_1O)_3Si-R''-SO_2N_3$$

and wherein $R_1$ is selected from the group consisting of alkyl, aryl, and cycloalkyl groups having from 1 to 14 carbon atoms, and $R''$ is an alkylene group having from 1 to 22 carbon atoms.

4. A composition in accordance with claim 1, wherein said poly(arylene sulfide) is poly(phenylene sulfide).

5. A composition in accordance with claim 4, wherein the amount of azidosilane incorporated in said composition is in the range of about 0.1 to about 2 wt. % based on the total weight of said composition.

6. A composition in accordance with claim 5, wherein the amount of fibrous reinforcement incorporated in said composition is in the range of about 25 to about 45 wt. % based on the total weight of said composition.

7. A composition in accordance with claim 4, wherein the amount of azidosilane incorporated in said composition is in the range of about 0.5 to about 1.5 wt. % based on the total weight of said composition, and wherein said azidosilane is of the formula $$(CH_3CH_2O)_3Si-R-SO_2N_3,$$

wherein R is an alkylene group having from 1 to 22 carbon atoms.

8. A composition in accordance with claim 7 which further contains about 0.10 to about 2.0 wt. % $Li_2CO_3$ and about 0.05 to about 2.0 wt. % of a high density polyethylene, and wherein said fibrous reinforcement is glass fiber and is present in an amount in the range of about 25 to about 45 wt. %, wherein said weight percentages are based on the total weight of said composition.

9. A poly(arylene sulfide) composition which is essentially free of mineral fillers, comprising a poly(arylene sulfide), glass fibers in an amount in the range of about 5 to about 70 wt. %, and an azidosilane of the formula $$(R_1O)_3Si-R''-SO_2N_3,$$

wherein $R_1$ is selected from the group consisting of alkyl, aryl, and cycloalkyl groups having from 1 to 14 carbon atoms and $R''$ is an alkylene group having 1 to 22 carbon atoms, wherein said azidosilane is present in an amount in the range of about 0.005 to about 10 wt. %, wherein said weight percentages are based on the total weight of said composition.

10. A method of increasing the strength of a fiber reinforced poly(arylene sulfide) polymer composition which consists essentially of incorporating at least one azidosilane in said polymer composition.

11. A method in accordance with claim 10, wherein the amount of fibrous reinforcement in said composition is in the range of about 5 to about 70 weight percent based on the total weight of said composition.

12. A method in accordance with claim 10, wherein the amount of azidosilane incorporated in said composition is in the range of about 0.005 to about 10 wt. % based on the total weight of said composition.

13. A method in accordance with claim 10, wherein said azidosilane is of the formula $$(R_1O)_3Si-R''-SO_2N_3$$

and wherein $R_1$ is selected from the group consisting of alkyl, aryl, or cycloalkyl groups having from 1 to 14 carbon atoms, and $R''$ is an alkylene group having from 1 to 22 carbon atoms.

14. A method in accordance with claim 10, wherein said poly(arylene sulfide) is poly(phenylene sulfide).

15. A method in accordance with claim 14, wherein the amount of fibrous reinforcement in said composition is in the range of about 25 to about 45 wt. % based on the total weight of said composition.

16. A method in accordance with claim 14, wherein the amount of azidosilane incorporated in said composition is in the range of about 0.5 to about 1.5 wt. % based on the total weight of said composition, and wherein said azidosilane is of the formula $$(CH_3CH_2O)_3Si-R-SO_2N_3,$$

wherein R is an alkylene group having from 1-22 carbon atoms.

17. A method in accordance with claim 14 wherein said fiber reinforced poly(arylene sulfide) composition further contains at least one component selected from the group consisting of corrosion inhibitors, nucleating agents, mold release agents and pigments.

18. A method in accordance with claim 14 wherein said fiber reinforced poly(arylene sulfide) composition contains said fiber reinforcement in an amount in the range of about 25 to about 45 wt. %, and said composition further contains about 0.10 to about 2.0 wt. % $Li_2CO_3$ and about 0.05 to about 2.0 wt. % of a high density polyethylene wherein said weight percentages are based on the total weight of said composition.

* * * * *